(12) United States Patent
Kasarla et al.

(10) Patent No.: US 12,086,308 B2
(45) Date of Patent: Sep. 10, 2024

(54) VEHICULAR DRIVER ASSIST SYSTEM WITH ADJUSTABLE DISPLAY

(71) Applicant: Magna Electronics Inc., Auburn Hills, MI (US)

(72) Inventors: Nagender Reddy Kasarla, New Hudson, MI (US); Sujith Gurram, Orion Township, MI (US); Suresh Boddi, New Hudson, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 150 days.

(21) Appl. No.: 17/648,183

(22) Filed: Jan. 18, 2022

(65) Prior Publication Data

US 2022/0230456 A1    Jul. 21, 2022

Related U.S. Application Data

(60) Provisional application No. 63/199,836, filed on Jan. 28, 2021, provisional application No. 63/199,817, (Continued)

(51) Int. Cl.
| | |
|---|---|
| *G06F 3/01* | (2006.01) |
| *B60K 35/00* | (2006.01) |
| *G06T 7/70* | (2017.01) |
| *G06T 11/00* | (2006.01) |
| *G06V 20/59* | (2022.01) |

(Continued)

(52) U.S. Cl.
CPC ............. *G06F 3/013* (2013.01); *B60K 35/00* (2013.01); *G06T 7/70* (2017.01); *G06T 11/00* (2013.01); *G06V 20/593* (2022.01); *G06V 40/12* (2022.01); *B60K 35/10* (2024.01); *B60K 35/23* (2024.01); *B60K 35/28* (2024.01); *B60K 2360/149* (2024.01); *B60K 2360/164* (2024.01); *B60K 2360/166* (2024.01); *B60K 2360/21* (2024.01);
(Continued)

(58) Field of Classification Search
None
See application file for complete search history.

(56) References Cited

U.S. PATENT DOCUMENTS

| | | | |
|---|---|---|---|
| 4,546,551 A | 10/1985 | Franks | |
| 4,953,305 A | 9/1990 | Van Lente et al. | |

(Continued)

FOREIGN PATENT DOCUMENTS

| | | | |
|---|---|---|---|
| DE | 102018003158 A1 | * | 9/2018 |
| JP | 2005247224 A | * | 9/2005 |
| WO | 2022150826 A1 | | 7/2022 |

*Primary Examiner* — Jwalant Amin
(74) *Attorney, Agent, or Firm* — HONIGMAN LLP (57) ABSTRACT

A vehicular driver assist system includes a sensor disposed at a vehicle and a display disposed at the vehicle and viewable by a driver of the vehicle. An electronic control unit (ECU) includes a processor for processing sensor data captured by the sensor to detect presence of objects in the field of view of the sensor. The vehicular driver assist system, responsive to processing by the processor of sensor data captured by the sensor, determines presence of a driver of the vehicle and determines a position of the driver's head. The vehicular driver assist system, responsive to determining the position of the driver's head, adjusts an orientation of the display based on the determined position of the driver's head to increase visibility of the display for the driver.

21 Claims, 10 Drawing Sheets

Related U.S. Application Data filed on Jan. 27, 2021, provisional application No. 63/199,724, filed on Jan. 20, 2021.

(51) Int. Cl.
*G06V 40/12* (2022.01)
*B60K 35/10* (2024.01)
*B60K 35/23* (2024.01)
*B60K 35/28* (2024.01)

(52) U.S. Cl.
CPC ............ G06T 2207/10044 (2013.01); G06T 2207/30268 (2013.01)

(56) References Cited

U.S. PATENT DOCUMENTS

| | | |
|---|---|---|
| 5,530,240 A | 6/1996 | Larson et al. |
| 5,550,677 A | 8/1996 | Schofield et al. |
| 5,576,687 A | 11/1996 | Blank et al. |
| 5,632,092 A | 5/1997 | Blank et al. |
| 5,668,663 A | 9/1997 | Varaprasad et al. |
| 5,670,935 A | 9/1997 | Schofield et al. |
| 5,699,044 A | 12/1997 | Van Lente et al. |
| 5,708,410 A | 1/1998 | Blank et al. |
| 5,724,187 A | 3/1998 | Varaprasad et al. |
| 5,737,226 A | 4/1998 | Olson et al. |
| 5,802,727 A | 9/1998 | Blank et al. |
| 5,878,370 A | 3/1999 | Olson |
| 5,949,331 A | 9/1999 | Schofield et al. |
| 6,087,953 A | 7/2000 | DeLine et al. |
| 6,173,501 B1 | 1/2001 | Blank et al. |
| 6,222,460 B1 | 4/2001 | DeLine et al. |
| 6,329,925 B1 | 12/2001 | Skiver et al. |
| 6,513,252 B1 | 2/2003 | Schierbeek et al. |
| 6,642,851 B2 | 11/2003 | Deline et al. |
| 6,690,268 B2 | 2/2004 | Schofield et al. |
| 7,004,593 B2 | 2/2006 | Weller et al. |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,308,341 B2 | 12/2007 | Schofield et al. |
| 7,329,013 B2 | 2/2008 | Blank et al. |
| 7,338,177 B2 | 3/2008 | Lynam |
| 7,370,983 B2 | 5/2008 | DeWind et al. |
| 7,446,650 B2 | 11/2008 | Scholfield et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,855,755 B2 | 12/2010 | Weller et al. |
| 9,041,806 B2 | 5/2015 | Baur et al. |
| 9,126,525 B2 | 9/2015 | Lynam et al. |
| 9,264,672 B2 | 2/2016 | Lynam |
| 9,405,120 B2 | 8/2016 | Graf et al. |
| 9,596,387 B2 | 3/2017 | Achenbach et al. |
| 9,762,880 B2 | 9/2017 | Pflug |
| 9,834,153 B2 | 12/2017 | Gupta et al. |
| 9,900,522 B2 | 2/2018 | Lu |
| 10,046,706 B2 | 8/2018 | Larson et al. |
| 10,054,796 B2 * | 8/2018 | Bickerstaff .......... H04N 23/683 |
| 10,071,687 B2 | 9/2018 | Ihlenburg et al. |
| 10,099,614 B2 | 10/2018 | Diessner |
| 10,166,924 B2 | 1/2019 | Baur |
| 10,421,404 B2 | 9/2019 | Larson et al. |
| 10,442,360 B2 | 10/2019 | LaCross et al. |
| 11,518,401 B2 | 12/2022 | Kulkarni |
| 2006/0050018 A1 | 3/2006 | Hutzel et al. |
| 2006/0061008 A1 | 3/2006 | Karner et al. |
| 2012/0162427 A1 | 6/2012 | Lynam |
| 2014/0022390 A1 | 1/2014 | Blank et al. |
| 2014/0336876 A1 | 11/2014 | Gieseke et al. |
| 2015/0009010 A1 * | 1/2015 | Biemer .................. G06F 21/32 340/5.83 |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0224932 A1 * | 8/2015 | Mohan .................... B60R 1/025 359/876 |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0314682 A1 * | 11/2015 | Enriquez Ortiz ...... G02B 30/30 701/49 |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0088168 A1 * | 3/2017 | Oyama ................ G05D 1/0234 |
| 2017/0274906 A1 | 9/2017 | Hassan et al. |
| 2017/0355312 A1 | 12/2017 | Habibi et al. |
| 2018/0032300 A1 * | 2/2018 | Singh ...................... G06F 3/013 |
| 2018/0147985 A1 * | 5/2018 | Brown .................. H04N 23/63 |
| 2018/0222414 A1 | 8/2018 | Ihlenburg et al. |
| 2019/0047475 A1 | 2/2019 | Uken et al. |
| 2019/0118717 A1 | 4/2019 | Blank et al. |
| 2019/0146297 A1 | 5/2019 | Lynam et al. |
| 2019/0258131 A9 | 8/2019 | Lynam et al. |
| 2020/0074491 A1 * | 3/2020 | Scholl ................ G06F 11/3055 |
| 2020/0377022 A1 | 12/2020 | LaCross et al. |
| 2021/0094473 A1 | 4/2021 | Gali et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0272532 A1 * | 9/2021 | Henderson ............ G06F 1/1656 |
| 2021/0309182 A1 | 10/2021 | Ragunathan |
| 2021/0323473 A1 | 10/2021 | Peterson et al. |
| 2022/0317767 A1 * | 10/2022 | Zhang .................... G06V 10/12 |

\* cited by examiner

VEHICULAR DRIVER ASSIST SYSTEM WITH ADJUSTABLE DISPLAY

CROSS REFERENCE TO RELATED APPLICATIONS

The present application claims the filing benefits of U.S. provisional application Ser. No. 63/199,836, filed Jan. 28, 2021, U.S. provisional application Ser. No. 63/199,817, filed Jan. 27, 2021, and U.S. provisional application Ser. No. 63/199,724, filed Jan. 20, 2021, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle may include at least one sensor disposed at a vehicle equipped with the vehicular driver assist system and viewing interior of the vehicle. The at least one sensor captures sensor data. The system includes one or more displays disposed at the vehicle and viewable by the driver of the vehicle when the driver is driving the vehicle and an electronic control unit (ECU) including electronic circuitry and associated software. The electronic circuitry of the ECU includes a processor for processing sensor data captured by the at least one sensor to detect presence of objects in the field of view of the sensor. The system, responsive to processing by the processor of sensor data captured by the at least one sensor, determines presence of a driver of the vehicle. The system, responsive to processing by the processor of sensor data captured by the at least one sensor, determines a position of at least a portion of the driver's head and/or determines a gaze direction of the driver's eyes. The system, responsive to determining the position of the at least a portion of the driver's head and/or gaze direction, adjusts an orientation or location of one of the one or more displays.

Optionally, the system utilizes one or more cameras (preferably one or more CMOS cameras disposed at an in-cabin side of the vehicle windshield and viewing through the windshield forward of the vehicle) to capture image data representative of images exterior of the vehicle, and provides captured image data to a first electronic control unit (ECU) comprising electronic circuitry and associated software. The electronic circuitry of the first ECU includes an image processor for processing image data captured by the camera to detect presence of objects in the field of view of the camera. The system also includes a second ECU including electronic circuitry and associated software and the electronic circuitry of the second ECU includes an image processor for enhancing image data captured by the camera. The system includes a display disposed within the vehicle for displaying frames of image data. The system, such as at the first ECU, responsive to processing by the image processor of image data captured by the camera, detects objects for an object detection function of the vehicle. The system, such as at the second ECU, responsive to a navigation function of the vehicle, enhances frames of captured image data with a graphical overlay. The system displays the enhanced frames of captured image data with the graphical overlay at the display.

Optionally, the system includes a first sensor disposed at the vehicle and sensing exterior of the vehicle. The first sensor captures sensor data. The system also includes a second sensor disposed at a vehicle equipped with the vehicular control system and sensing interior of the vehicle. The second sensor captures sensor data. The system also includes an electronic control unit (ECU) with electronic circuitry and associated software. The electronic circuitry of the ECU includes a processor for processing sensor data captured by the first sensor and the second sensor. The system, when the vehicle is empty of occupants, enables a door mode. The system, when the door mode is enabled, and responsive to a user approaching the vehicle, and responsive to processing by the processor of sensor data captured by the first sensor, determines that the user exterior of the vehicle is authorized to access the cabin of the vehicle. The system, responsive to the user entering the vehicle, disables the door mode and enables a cabin mode. The system, when the cabin mode is enabled, and responsive to processing by the processor of sensor data captured by the second sensor, determines that the user is authorized to operate the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vehicle vison system may operate to capture data of an interior of the vehicle and may process the data to detect objects and occupants within the vehicle. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
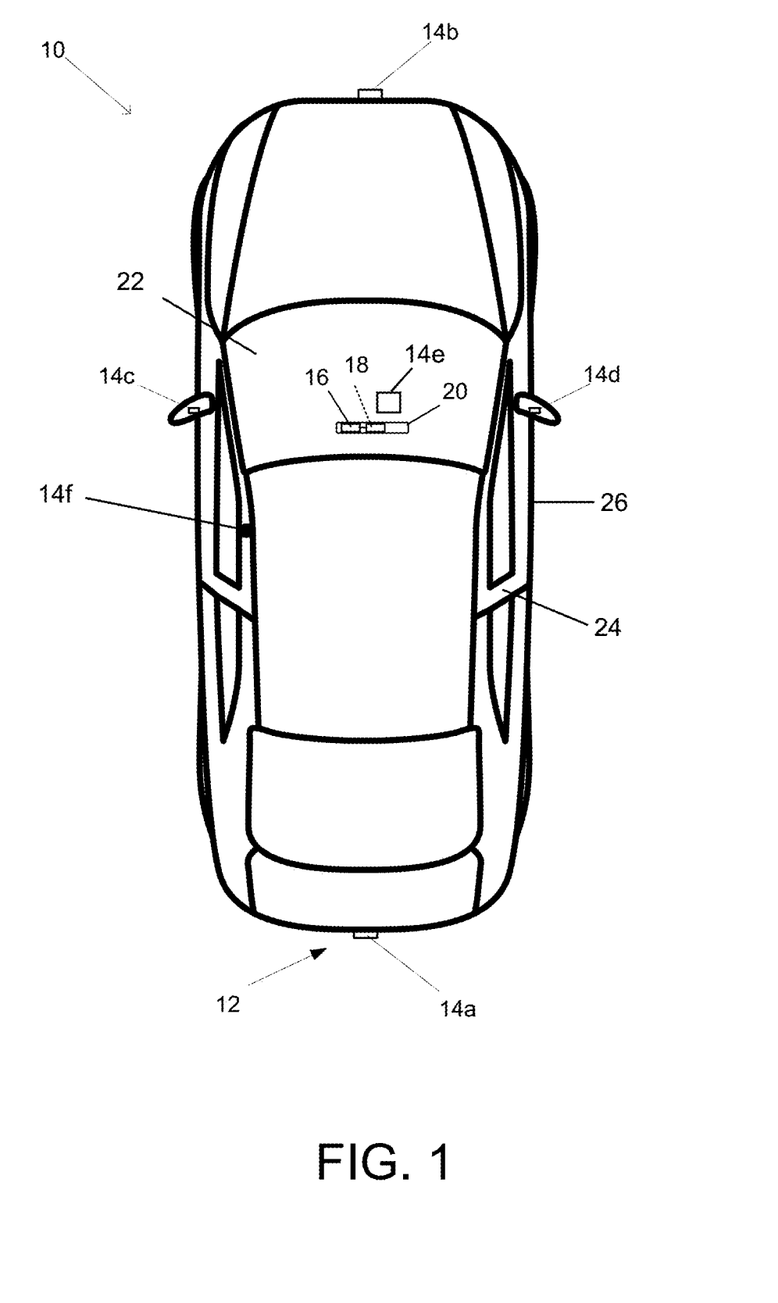
FIG. 1 is a plan view of a vehicle with an imaging system that incorporates cameras viewing exterior of the vehicle and cameras viewing interior of the vehicle.

Referring now to the drawings and the illustrative embodiments depicted therein, a vehicle 10 includes a sensing system or driver assist system or driving assist system 12 that includes at least one interior viewing imaging sensor or camera, such as a rearview mirror imaging sensor or camera 16 (FIG. 1). Optionally, an interior viewing camera may be disposed at the windshield of the vehicle. Optionally, the system 12 includes one or more exterior viewing imaging sensors or cameras 14, such as a forward viewing camera 14b at the front of the vehicle, and a sideward/rearward viewing camera 14c, 14d at respective sides of the vehicle, and a rearward viewing camera 14a at the rear of the vehicle, and each camera 14 respectively captures images exterior of the vehicle. The camera or cameras each include a lens for focusing images at or onto an imaging array or imaging plane or imager of the camera. Optionally, the system 12 may include a forward viewing imaging sensor or camera 14e, which may be disposed at and behind the windshield 22 of the vehicle and viewing forward through the windshield 22 so as to capture image data representative of the scene occurring forward of the vehicle. The forward viewing camera 14e disposed at the windshield 22 of the vehicle 10 views through the windshield 22 and forward of the vehicle, such as for a machine vision system (such as for traffic sign recognition, headlamp control, pedestrian detection, collision avoidance, lane marker detection and/or the like). Optionally, the vision system 12 includes at least one exterior viewing imaging sensor or camera 14f disposed at, for example, the windshield 22, an A-pillar or B-pillar 24, or a door 26 of the vehicle 10. The vision system 12 includes a control or electronic control unit (ECU) 18 having electronic circuitry and associated software, with the electronic circuitry including a data processor or image processor that is operable to process image data captured by the sensor or camera or cameras, whereby the system, such as via processing at the ECU, may detect or determine presence of objects or the like. The data transfer or signal communication from the sensor or camera to the ECU may comprise any suitable data or communication link, such as a vehicle network bus or the like of the equipped vehicle.

Figure 2:
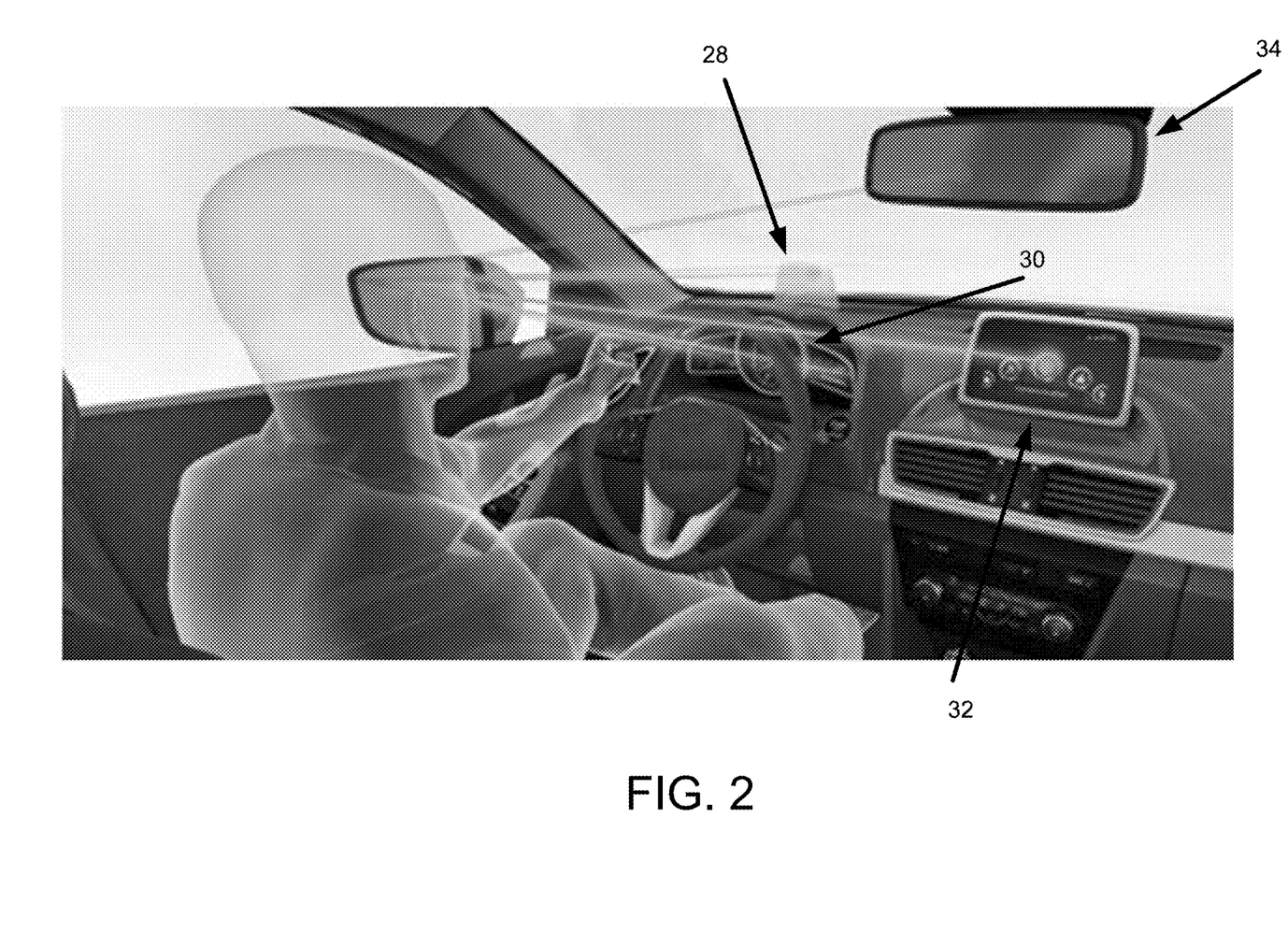
FIG. 2 is a perspective view of a cabin of the vehicle equipped with the imaging system.

Referring now to FIG. 2, implementations herein include a driver assist or driving assist system 12 that includes multiple digital display adjustments to increase driver or operator comfort. As technology advances, new features are being incorporated into vehicles, such as digital displays, touch displays, driver monitoring systems, cabin monitoring systems, etc. The driver assist system 12 utilizes these technologies in combination to provide additional comfort features to the driver and/or passengers. The system uses a driver monitoring system (DMS) and/or occupant monitoring system (OMS) along with face tracking and/or eye gaze angle tracking inputs to automatically adjust display view position of displays (e.g., head-up displays 28, cluster displays 30, infotainment/center console displays 32, rear view mirror displays 34, etc.) in the vehicle for a better viewing experience for the occupant(s). The system may improve comfort for the driver or operator of the vehicle. Additionally or alternatively, the system may improve comfort for other occupants of the vehicle.

Figure 3:
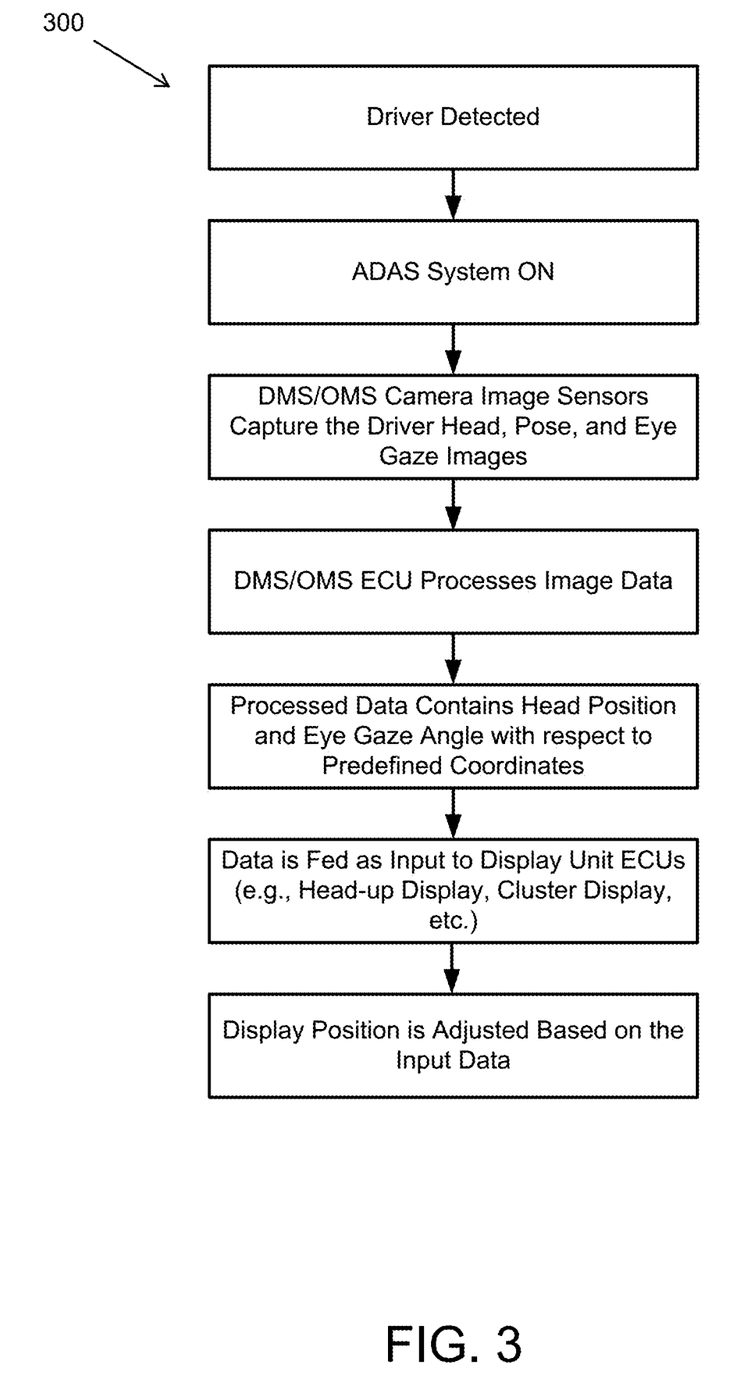
FIG. 3 is a block diagram of the imaging system of FIG. 2.

Components of the driver assist system may be disposed at or installed at a variety of locations throughout the cabin. For example, sensors for tracking occupant head position and/or eye gaze angle may be disposed at a location at or above the dash, at the rearview mirror assembly, at or near the instrument cluster, etc. As shown in FIG. 3, an exemplary method 300 of operations undertaken by the system 12 tracks, for example a user's gaze, and adjusts a display of the vehicle accordingly (i.e., adjusts the display such that the driver has better visibility of the display from the driver's current head and eye position). The system 12 may first use one or more sensors (e.g., an image sensor such as a camera) to detect the presence of the driver (or other occupant). When the driver is detected, the camera or image sensor captures image data representative of at least a portion of the driver's head, pose, and/or eye gaze and the system processes the captured image data to determine or measure, for example, the head position and/or eye gaze angle of the driver.

The system may determine the driver's head position and/or eye gaze angle relative to predefined coordinates. For example, the system may display images at the display screen in a default orientation (i.e., default angle of the display screen or default orientation of the display screen) based on default coordinates within the vehicle that correspond to a common or default head position of the driver and adjust the display based on a difference between the driver's head position or eye gaze angle relative to the predefined or default coordinates. The camera may capture the image data responsive to the system detecting the driver or occupant (e.g., when or before the vehicle is started) and the system may automatically adjust the display screen position based on the determined driver position. Optionally, a manual adjust option for the display or displays is included for the driver/occupant to adjust the displays as needed (in addition to the automatic adjustment option) or the system may include a user actuatable input for activating the system to adjust the display based on the driver's head position and/or eye gaze angle.

The input data provided from driver monitoring system/occupant monitoring system (e.g., inputs regarding the head position of one or more occupants of the vehicle or eye gaze angles of one or more occupants) may be provided to one or more different display ECUs that automatically adjust view position of the display units for better viewing experience for the driver. The display ECUs may be independent or part of a master or primary ECU. Thus, the system may change the orientation (e.g., rotate about one or more axis) of one or more displays disposed within the cabin of the vehicle based on sensor data that captures information regarding one or more occupants of the vehicle and other parameters (e.g., predefined coordinates with respect to head position and eye gaze angles). The displays may include motors controlled by the display ECUs that rotate or otherwise adjust the display screen relative to the occupant such that the occupant can better view the display from his or her current position (e.g., based on the height of the occupant, the seat position of the occupant, etc.). Optionally, the system may shift display of information or images from display at one display screen or device to display at another display screen or device (e.g., shift display of information from a display screen at the center console of the vehicle to a display screen at the interior rearview mirror assembly of the vehicle). Optionally, the system may digitally adjust the images provided at one or more display screens, such as to tilt or rotate or pivot the provided images, based on the position and viewing angle of the driver or occupant.

The system thus may adjust the position and/or orientation of the display responsive to determination of the driver's head or eyes or gaze direction. For example, the system may adjust a projected location of a heads up display responsive to such determination, so that the display is projected in front of the driver at a location that is based on the position of the driver's head and/or eyes and that is thus optimized for the driver to see and understand. Thus, the system may adjust the heads up display based on the driver's gaze angle, such as to overlay information with corresponding detected objects in the driver's field of view, such as to overlay information at or near detected road signs.

The system may adjust the displays at startup and optionally may continually update the displays or may episodically update the displays at regular intervals for as long as the vehicle is operated. Optionally, the user may actuate a user input (e.g., a button) to activate the system to perform a one-time adjustment or to enable/disable continuous adjustment.

Different displays may be oriented to face different occupants. For example, a cluster display 30 may be oriented to best present to the driver or operator of the vehicle while the infotainment display 32 may be oriented to best present to an occupant in a passenger seat. The system may provide user inputs to select which occupants are assigned to which displays. The system may automatically detect each occupant of the vehicle using any number of sensors (i.e., pressure sensors, infrared sensors, image sensors, ultrasonic sensors, etc.), and may adjust the respective display according to a determined head and eye position or gaze direction of the respective occupant.

Optionally, the system may process image data captured by the one or more cameras of the vehicle to display enhanced, modified, and/or adjusted images derived from the captured image data. For example, the system may display images at the display of the vehicle with graphical overlays or with portions of the image data modified to improve visibility of detected objects.

Figure 4:
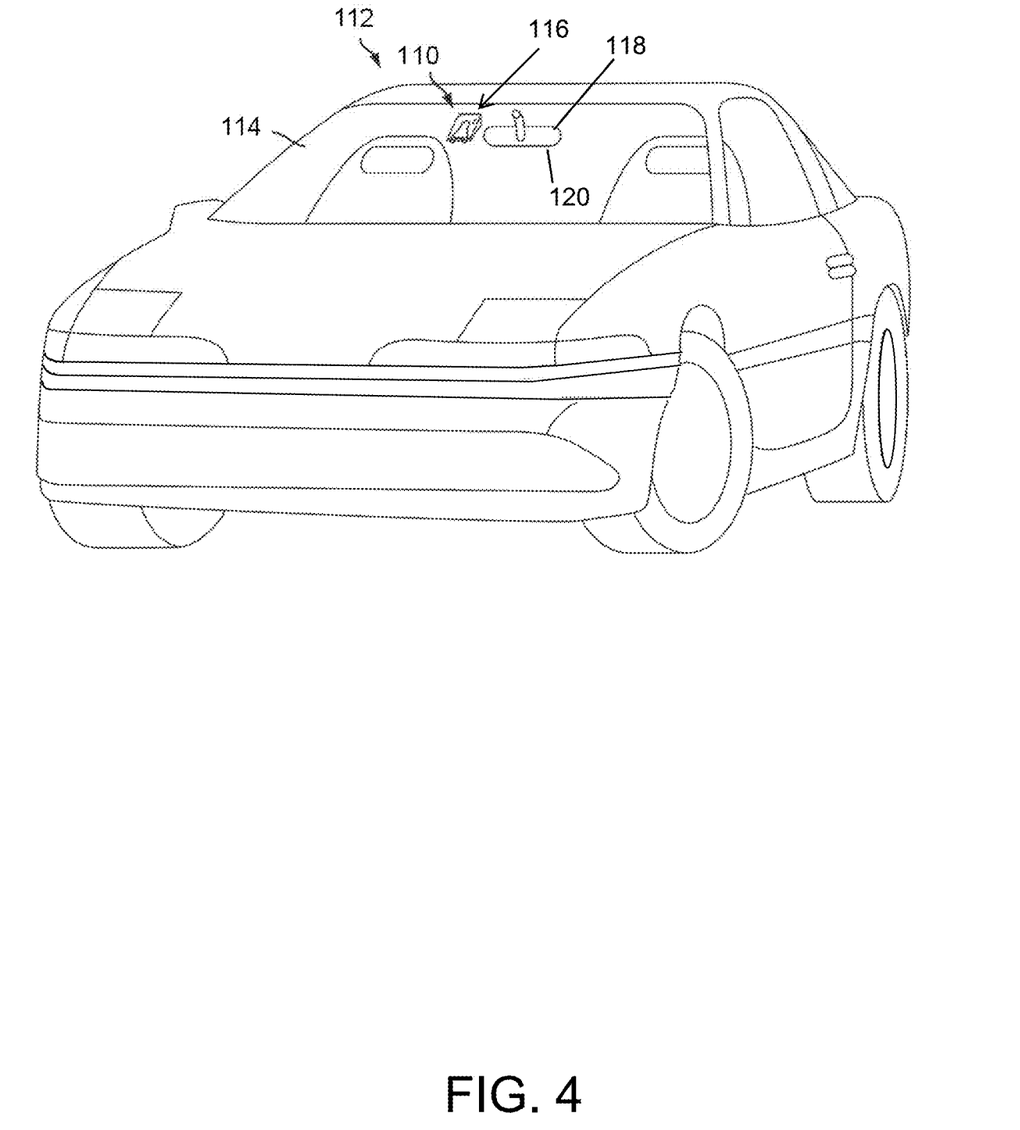
FIG. 4 is a perspective view of a vehicle with a driver assist system that incorporates a vehicular vision system.

Referring to FIG. 4, a vision system 110 for a vehicle 112 includes at least one exterior viewing imaging sensor or camera 116, such as a forward viewing imaging sensor or camera, which may be disposed at and behind the windshield 114 of the vehicle and viewing forward through the windshield so as to capture image data representative of the scene occurring forward of the vehicle (FIG. 4). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 110 includes a control or electronic control unit (ECU) having electronic circuitry and associated software, with the electronic circuitry including a data processor or image processor that is operable to process image data captured by the camera or cameras, whereby the system, such as via processing at the ECU, may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle. The system may include one or more displays 120 (e.g., at a rearview mirror 118).

Augmented reality (AR) is commonly defined as an interactive experience that blends a real-world environment with computer-generated or enhanced objects. The system 110 may capture frames of image data using the front camera module (FCM) 116 such as a camera mounted at the windshield 114 as illustrated in FIG. 1 (and optionally image data is captured by one or more of the other cameras disposed at the vehicle). The captured frames of image data are passed in "real-time" (i.e., "live" frames of captured image data that are representative of the scene the driver or other occupant of the vehicle is currently viewing) to a navigation system of the vehicle. The navigation system modifies or adjusts or enhances the captured frames of image data by adding graphical overlays on the frames (e.g., using AR principles). The navigation system displays these modified or adjusted or enhanced frames of captured image data to the occupant via a display disposed within the vehicle (e.g., a cluster display 130, an infotainment display 132, a rearview mirror display 134, etc.). Thus, the system captures image data using the forward viewing camera of the vehicle, and processes the captured image data to provide video images having a graphical overlay at a display of the vehicle.

Figure 5:
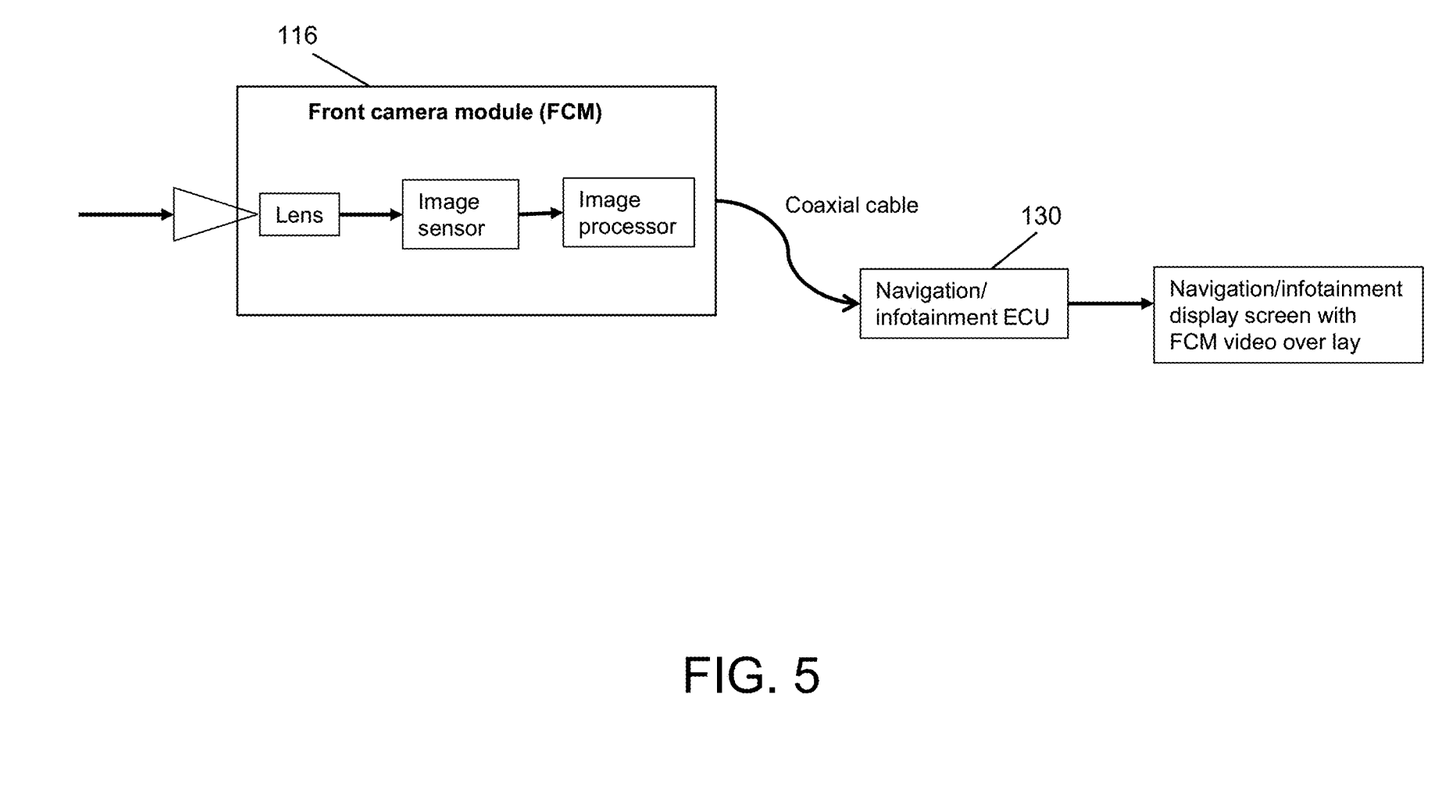
FIG. 5 is a block diagram of an imaging system of processing image data at a secondary ECU to enhance or modify the captured image data.
Figure 6:
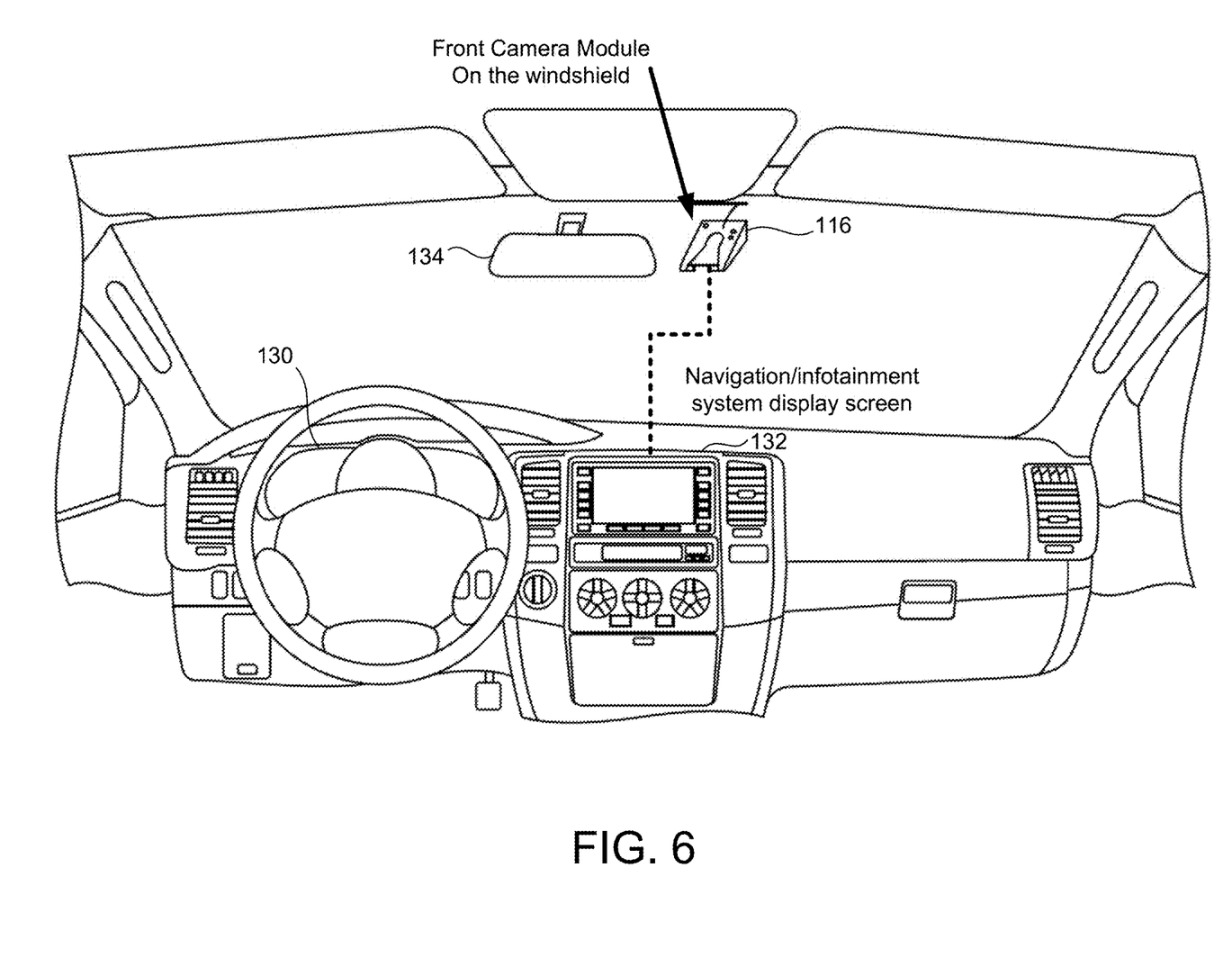
FIG. 6 is a perspective view of the cabin of the vehicle of FIG. 4 equipped with the image system of FIG. 5.

Referring now to FIG. 5, the vehicle, in some examples, is equipped with the windshield-mounted forward viewing camera or front camera module (FCM) 116 for any number of advanced driver-assistance systems (ADAS) such as object detection, pedestrian detection, collision avoidance and mitigation, lane keep assist, traffic sign recognition and/or automatic headlamp control and/or the like. For example, the FCM 116 captures frames of image data that are processed by one or more ECUs (or optionally one or more processors at the ECU 18) to provide one or more ADAS related functions such as object detection. Although the image processor is shown as part of the front camera module 116, it should be understood that the image processor may be at the ECU 18, which may be disposed remote from the front camera module 116. In addition to these ADAS functions, the FCM 116 provides captured frames of image data via, for example, a coaxial cable, to a navigation and/or infotainment or secondary ECU 130. The navigation ECU 130 may be separate and independent from the ADAS or main or primary ECU 18 or the processing functions for the ADAS functions and/or the navigation/infotainment functions may be provided as a single or common ECU. In some examples, the navigation ECU 130 modifies or adjusts or enhances the images (e.g., by overlaying graphical information on the captured frames of image data) based on current navigation data (e.g., a current navigation route) and transmits the modified or adjusted or enhanced frames to the display 118 for displaying the enhanced frames of image data. FIG. 6 provides an exemplary interior view of a vehicle including the driver assist system. As shown in FIG. 6, the front camera module 116 is disposed at the windshield of the vehicle and is connected to the ECU via a coaxial cable (preferably routed through the headliner and one of the A-pillars of the vehicle to avoid impeding visibility through the windshield or windows). The navigation ECU is located at or near the navigation/infotainment display screen. However, the camera, navigation ECU, and display may be disposed anywhere at or within the vehicle.

The system may enhance the captured frames of image data with a variety of data or information. For example, the navigation ECU and the system may provide for display at the display screen direction indications (e.g., an arrow indicating a street to turn on or a lane to switch to), road information (e.g., speed limits and other road or traffic rules), or any other information that may be useful to the driver, such as weather information and information regarding other vehicles or detected objects (e.g., pedestrians). For example, when the current navigation route (e.g., entered by the driver) indicates that the driver should turn right on an upcoming street, the ECU may enhance captured frames of image data (as captured by the FCM) to add an arrow pointing to the street the driver should turn on. The enhancements may flash, move, change color, etc. to draw the driver's attention or indicate additional information (such as a direction to maneuver). The enhanced frames of image data may be accompanied by various audio and/or haptic feedback and/or notifications and/or warnings. The system may enhance frames of image data even when there is not a current navigation route. For example, the system may overlay points of interest, street names, etc. to continually provide the driver or other occupants increased functionality.

The system may receive frames of captured image data from multiple different cameras and provide multiple different views. Additionally or alternatively, the system may merge the views from multiple cameras to provide a virtual point of view (e.g., a bird's-eye view) and enhance the frames of image data representing the virtual point of view in a similar manner. For example, when parking, the system may display a virtual point of view from above the vehicle and add graphical overlays to help mark the parking spot or other vehicles, add distances to other objects, etc.

As discussed above, the system may utilize one or more ECUs and/or processors at a single ECU. The system may process provided image data at a dedicated infotainment or navigation ECU or processor to provide the graphical overlays to preserve processing power at the main image processor for processing the image data. For example, the one or more cameras at the vehicle may capture image data and provide the captured image data to an image processor at an ECU of the vehicle. The system may process the captured image data to provide images (such as video images) for a variety of different functions of the vehicle, such as heads up display, rear backup images, etc. Only some of these displays may require or benefit from enhancement or modification from the secondary ECU, and thus only that portion of the image data may be processed at the secondary ECU prior to being provided at the display of the vehicle. Images that do not receive enhancement or modification may bypass the secondary ECU and be displayed at the vehicle. Thus, the primary ECU may process all image data while the secondary ECU may process only the image data intended to receive modification or enhancement.

Thus, the driver assist system incorporates additional functionality into an already existing FCM to allow for the use of augmented reality or enhanced navigation without the need for an additional camera or other hardware. The system graphically enhances captured frames of image data (captured by a forward viewing camera (e.g., camera 116) as the vehicle is driven forward along a road) to provide to the driver or other occupants of the vehicle enhanced navigation services such as by adding graphic overlays onto frames of captured image data so that the graphic overlays (such as arrows or driving instructions or the like) and video images are viewed together at the display screen.

Figure 7:
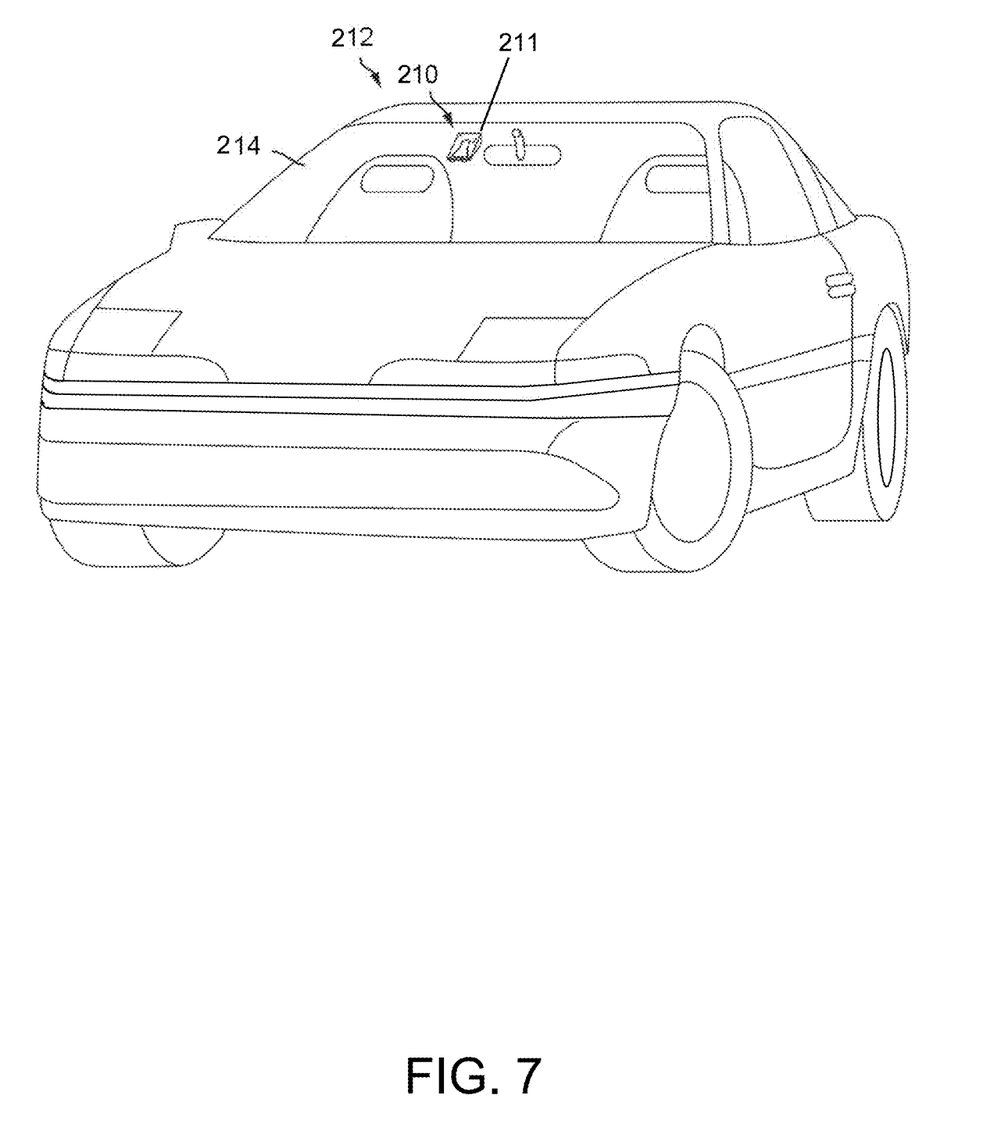
FIG. 7 is a perspective view of a vehicle with a vision system that incorporates a vehicular control system.

Optionally, a vehicular access system 210 of a vehicle 212 may be configured to process sensor data, such as from the one or more exterior viewing and interior viewing cameras 211 at the vehicle (e.g., disposed at a windshield 214), to determine whether to grant access to the cabin of the vehicle and whether to allow an occupant of the vehicle to operate the vehicle.

As described below, the vehicular access system may control (i.e., limit or allow) access to the cabin of the vehicle 212 (e.g., locking or unlocking the doors) and control operation of the vehicle (e.g., enabling ignition) using portions of advanced driver assistance systems (ADAS) such as driver monitoring systems and/or cabin monitoring systems along with other biometric systems such as a fingerprint scanner and/or voice recognition systems to provide additional security against any theft or other unauthorized access to the vehicle.

Figure 8:
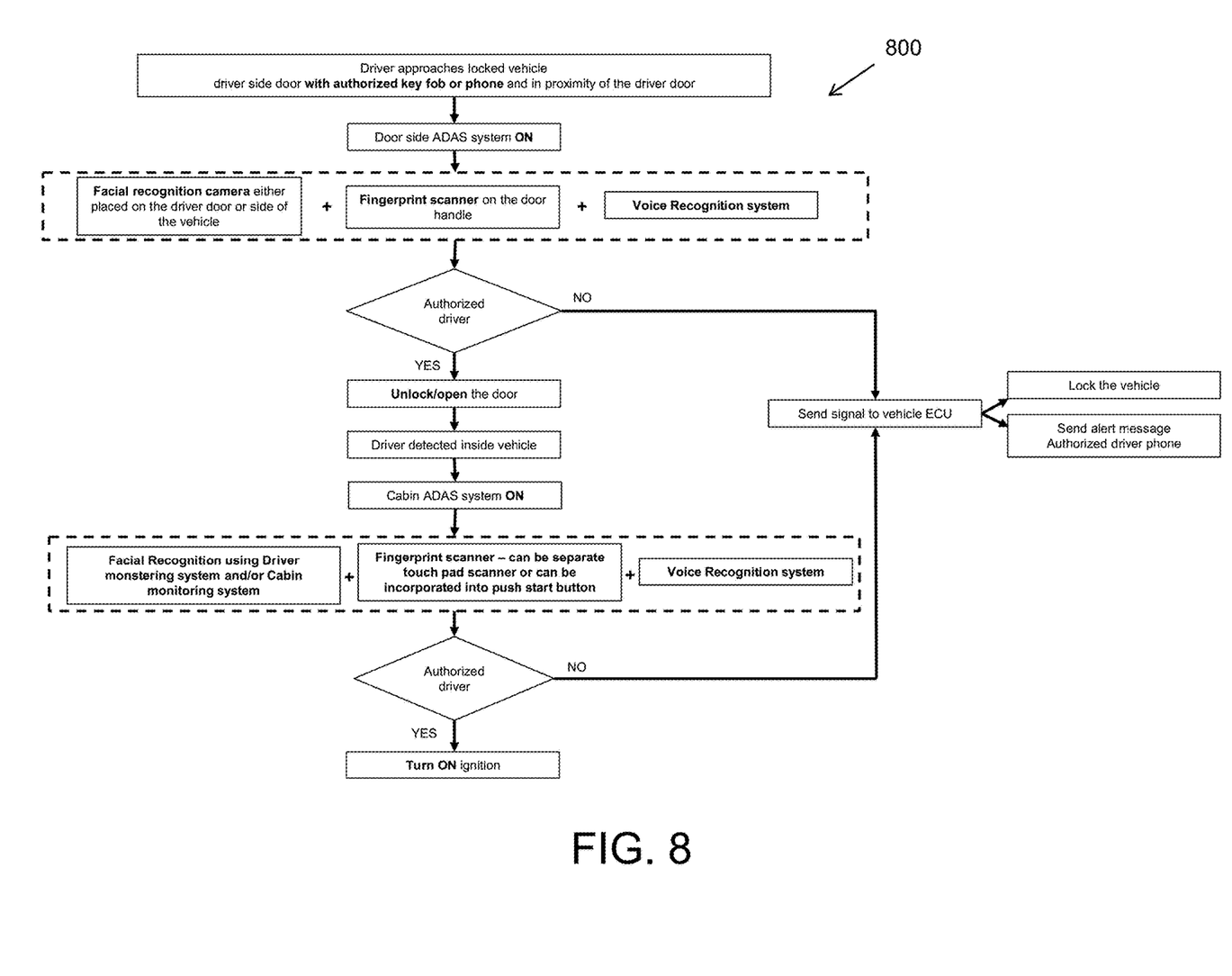
FIG. 8 is a block diagram of a sensor system processing captured sensor data to determine whether a user is authorized to access the cabin of the vehicle and whether the user is authorized to operate the vehicle.
Figure 9:
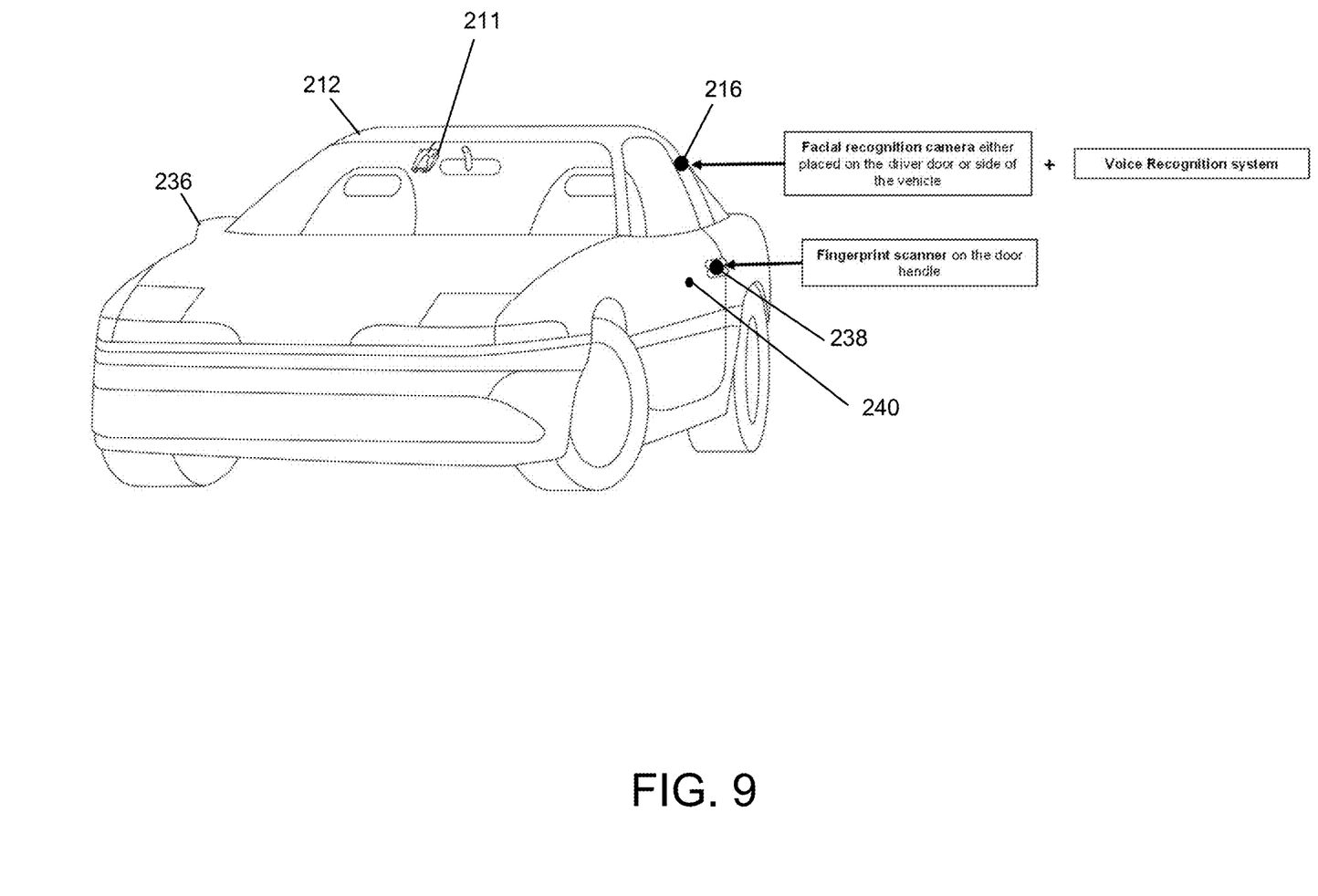
FIG. 9 is a perspective view of the vehicle of FIG. 7 equipped with the sensor system of FIG. 8 and biometric sensors disposed at the exterior of the vehicle.

FIG. 8 depicts an exemplary flowchart 800 of an optional aspect of the system that includes determining whether to grant access to the vehicle to a user and whether the user is authorized to operate the vehicle. Referring now to FIGS. 8 and 9, when the vehicle is empty (i.e., does not have occupants), is switched off, and/or is locked, the vehicle access system may enable a door mode. Optionally, when a user approaches the locked vehicle with an authorized key fob, mobile device, etc. (i.e., the user is within a threshold proximity of the vehicle with the authorized key fob), the system may employ one or more functions to confirm that the user of the key fob is an authorized user. For example, the system may operate a biometric sensor or system, such as a facial recognition camera, a fingerprint scanner, and/or a voice recognition system, etc., to determine whether the user is authorized to enter the vehicle. For example, image data captured by the exterior viewing camera 216 (FIG. 9) may be processed to determine or recognize facial features. The camera or sensor 216 may be placed on the driver door or side of the vehicle 212 (such as at an upper region of the door frame or at the driver-side B-pillar of the vehicle or the like) and may attempt to recognize the face of the driver as an authorized user of the vehicle (such as by comparing determined features of the person to a stored database of features of authorized users). Similarly, a fingerprint sensor (e.g., on or near the door handle) may attempt to recognize the driver when the door handle is grasped. In yet another example, the driver may speak a word or phrase so that the voice recognition system recognizes that the driver is authorized to enter the vehicle. In other words, responsive to a determining or sensing that an authorized key fob is within range of the door of the vehicle, the system may capture biometric data representative of an identify of a user attempting to access the vehicle. The system processes the captured biometric data to determine whether the user is authorized to access the cabin of the vehicle. The system may employ one or more functions either in conjunction or best combination or as separate security features. When one or more of these functions recognize the driver as an authorized user, the vehicular control system unlocks and/or opens a door of the vehicle or otherwise grants access to the interior (i.e., the cabin) of the vehicle. If the system determines that the user is an unauthorized user or the system does not recognize that the user is an authorized user, the system does not grant access to the vehicle. Further, the system may lock the vehicle (if not already locked), activate an alarm system of the vehicle, store the captured biometric data at memory storage of the system (for future identification of the unauthorized person that attempted to access the vehicle), and/or communicate an alert message to an owner of the vehicle regarding the unauthorized attempt to access the vehicle.

Thus, the system may include one or more sensors at the exterior of the vehicle and configured to capture sensor data. For example, and as shown in FIG. 9, the vehicle may have a facial recognition camera 216 configured to view a head region of a user approaching the vehicle. The facial recognition camera 216 may be positioned at the door of the vehicle (driver and optionally passenger side), at the door frame of the vehicle (such as at the A-pillar or B-pillar or roof directly above the door), or elsewhere at the side of the vehicle, such as the exterior rearview mirror assembly 236. Optionally, the facial recognition camera may be disposed interior the vehicle and view exterior the vehicle (such as through the windshield or a side window of the vehicle). For example, the forward viewing camera 211 at the windshield 212 of the vehicle may comprise the facial recognition camera or the facial recognition camera may be disposed at the dashboard of the vehicle and view through the side windows of the vehicle. A fingerprint scanner or sensor 238 may be disposed in any suitable position for capturing fingerprint data from a user, such as at the door or door handle of the vehicle. A microphone 240 may be disposed in any suitable position for capturing audio data representative of a user's voice exterior the vehicle, such as at the side or door of the vehicle.

Optionally, the system may receive the captured sensor data for authorizing a user for access to the vehicle from a sensor remote from the vehicle and in communication with the system of the vehicle. For example, the key fob or other mobile device (e.g., a mobile phone) may capture sensor data and communicate the captured sensor data to the system for authorization to access the vehicle. The key fob may comprise a mobile device.

Figure 10:
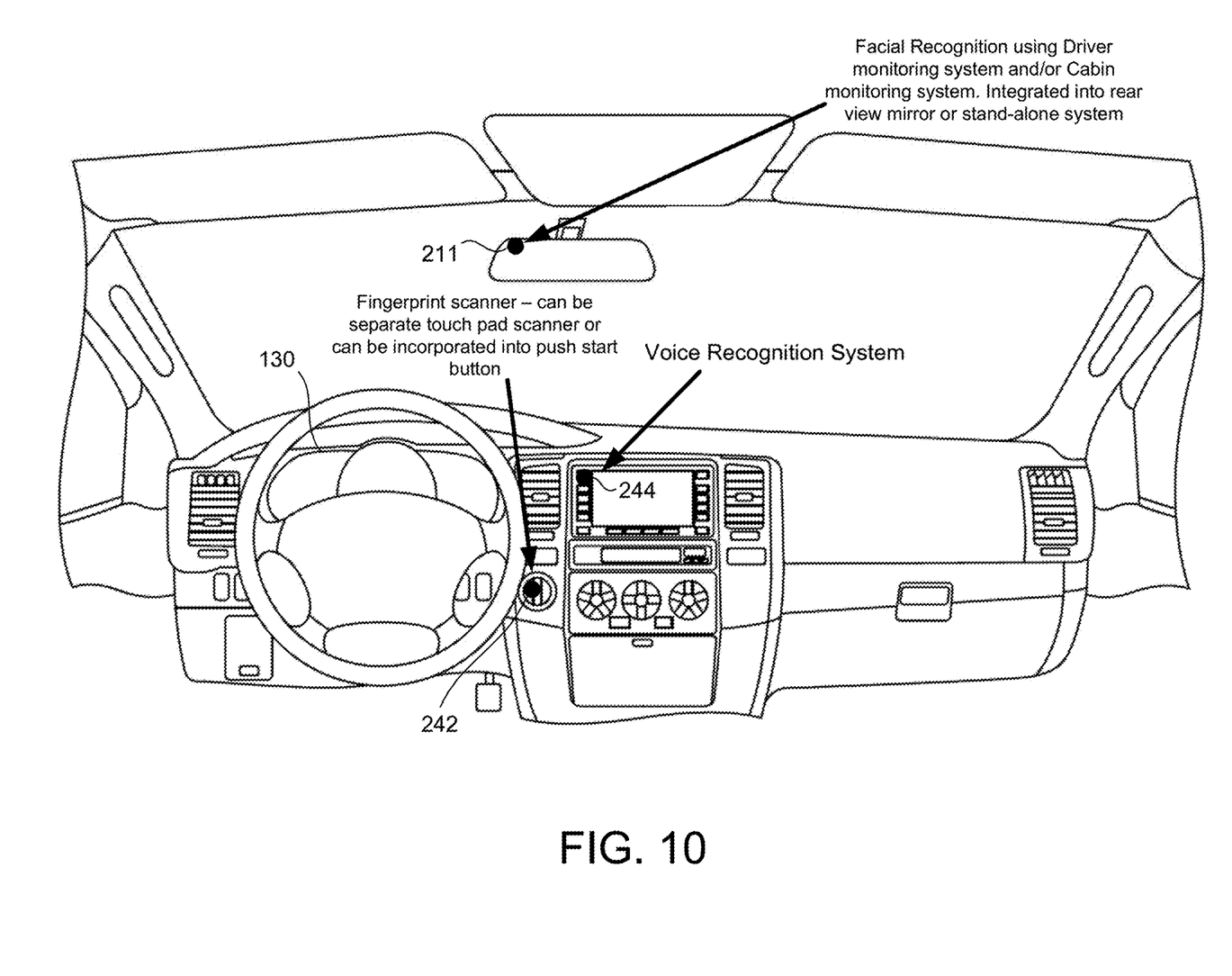
FIG. 10 is a perspective view of the cabin of the vehicle of FIG. 7 equipped with the sensor system of FIG. 8 and biometric sensors disposed at the interior of the vehicle.

Referring now to FIGS. 8 and 10, once the driver or occupant is within the vehicle, the vehicle control system may disable the security or door mode and enable a cabin mode. For example, after granting access to the vehicle, the system may detect presence of a driver or occupant in the vehicle and enable the cabin mode (e.g., via cameras, seat sensors, microphones, etc.). In the cabin mode, the system may use the same functions (e.g., biometric sensors such as a facial recognition camera, a fingerprint scanner, a voice recognition system, etc.) or different functions to determine whether the occupant (that is now in the vehicle) is authorized to start and/or operate the vehicle. That is, the system may detect the occupant's face or receive other biometric information (e.g., a fingerprint, voice, etc.) to determine that the occupant may turn on the ignition and operate the vehicle. The system may use the same sensors as the ones employed for the door mode or may use separate sensors (e.g., sensors disposed specifically within the cabin) for the cabin mode. For example, a first facial recognition camera 211 may have a field of view that encompasses the driver seat of the vehicle and a second facial recognition camera 216 may have a field of view that encompasses an area exterior of the driver door. The first facial recognition camera 211 comprises the driver monitoring camera disposed at the rearview mirror assembly of the vehicle, but may be disposed in any suitable position at the interior cabin of the vehicle. Responsive to determining that the occupant of the vehicle is authorized to start or operate the vehicle, the system may enable the vehicle or turn the vehicle on (i.e., activate the ignition).

Thus, the system may include one or more sensors at the interior of the vehicle and configured to capture sensor data. For example, and as shown in FIG. 10, the vehicle 212 may have the facial recognition camera 211 (i.e., a camera that captures image data that is processed to determine facial features) configured to view a head region of a user within the vehicle, such as seated in the driver seat. The facial recognition camera 211 may comprise a driver or occupant monitoring camera that is part of a driver or occupant monitoring system of the vehicle. The facial recognition camera 211 may be integrated into the rear view mirror or may be a stand-alone system. A fingerprint scanner or sensor 242 may be disposed in any suitable position for capturing fingerprint data of a user. For example, the fingerprint scanner 242 may be disposed at a surface of a push-button ignition. The user may press the ignition to start the vehicle and the system may capture the user's fingerprint to determine whether the user is authorized to start the vehicle. The fingerprint scanner may be part of a push-button start of the vehicle or may comprise a separate touch pad scanner. A microphone 244 may be disposed in any suitable position for capturing audio data. For example, the microphone may be part of an existing telecommunications system of the vehicle or a dedicated microphone for the system.

The system may access or maintain or store or receive one or more access lists identifying authorized users. The access data or list may contain stored biometric data (or other reference data) against which captured data may be compared or referenced to determine whether a user is an authorized user. For example, the access data may contain facial recognition features, and when the system captures image data representative of the face or head region of a user, the system may compare determined facial features of the captured image data to facial features attributed to authorized users of the access data to determine whether or not to grant access. Optionally, the access data may comprise data that is not user-specific for granting access to the vehicle, such as a list of authorized access codes, words, or phrases (received, for example, via audio input or at a keypad at the side of the vehicle).

Optionally, the system maintains two separate access lists or data fields. The first access list is referenced to determine users authorized to enter or access the vehicle while the second access list is referenced to determine users authorized to operate the vehicle. In other words, the door mode may verify users against the first access list while the cabin mode may verify users against the second access list. Optionally, the system may determine whether the user is authorized for the first access list and the second access list via the door mode. That is, the system may determine that the user is authorized to access and operate the vehicle prior to granting access to the vehicle. Optionally, the system may only grant access (e.g., unlock) certain doors of the vehicle based on the first and second access lists. For example, if a user is authorized to access the vehicle but not operate the vehicle (i.e., is authorized by the first list but not the second list), the system may unlock passenger doors of the vehicle but lock the driver door of the vehicle.

When a user who is not authorized to enter and/or operate the vehicle attempts to do so, the system may lock the vehicle (when the vehicle is not already locked) and send an alert to one or more authorized users of the vehicle (e.g., an owner of the vehicle). For example, the system (via the ECU) may transmit a wireless message that causes the owner or other authorized user of the vehicle to receive a notification on a mobile device (e.g., a cell phone).

Thus, the vehicular access system provides additional security for a vehicle by determining whether a user is authorized to enter a vehicle and whether a user is authorized to enable or operate a vehicle. The system collects biometric information, such as facial recognition, fingerprints, voice data, etc., to verify whether a user is authorized to enter the vehicle and whether a user within the vehicle is authorized to operate the vehicle. When a user who is not authorized to enter and/or operate the vehicle attempts to do so, the system may notify one or more authorized users of the vehicle along with taking additional safety precautions (e.g., locking the vehicle, sounding a horn, flashing lights, notifying law enforcement, storing captured data, etc.).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. No. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The sensor may, for example, comprise a radar sensor, such as an imaging radar sensor or sensors. The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The ECU includes a data processor for processing sensor data captured by the radar sensors.

The imaging radar and system may utilize aspects of the radars and systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or U.S. Publication Nos. US-2020-0150256; US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. No. 9,405,120 and/or U.S. Publication Nos. US-2018-0222414; US-2017-0274906; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/450,721, filed Oct. 13, 2021, now U.S. Pat. No. 11,518,401, which are hereby incorporated herein by reference in their entireties.

The system may utilize aspects of the biometric sensors and features described in U.S. Publication No. US-2021-0309182, which is hereby incorporated herein by reference in its entirety.

The first and second ECU may comprise a central or single ECU that processes image data captured by the cameras for a plurality of driving assist functions and that also provides display of video images (as enhanced by the ECU) to a video navigation display screen in the vehicle (such as at an interior rearview mirror assembly or at a central console or the like) for viewing by a driver of the vehicle. The ECU and system may utilize aspects of the systems described in U.S. Pat. No. 10,442,360 and/or 10,046,706, and/or U.S. Publication Nos. US-2021-0245662; US-2021-0162926; US-2021-0155167 and/or US-2019-0118717, and/or International PCT Application No. PCT/US22/70062, filed Jan. 6, 2022, which published on Jul. 14, 2022 as International Publication No. WO2022/150826, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver assist system, the vehicular driver assist system comprising:
   a sensor disposed at a vehicle equipped with the vehicular driver assist system and viewing interior of the vehicle, the sensor capturing sensor data;
   a display disposed at the vehicle and viewable by the driver of the vehicle when the driver is driving the vehicle;
   an electronic control unit (ECU) comprising electronic circuitry and associated software;
   wherein the electronic circuitry of the ECU comprises a processor for processing sensor data captured by the sensor;
   wherein the vehicular driver assist system adjusts an orientation of the display based on predefined coordinates, and wherein the predefined coordinates represent a default position based on a common position of a typical driver's head;
   wherein the vehicular driver assist system, via processing at the ECU of sensor data captured by the sensor, determines presence of a driver at a driver seat of the vehicle;
   wherein the vehicular driver assist system, via processing at the ECU of sensor data captured by the sensor, determines a position of at least a portion of the driver's head; and
   wherein the vehicular driver assist system, responsive to determining the position of the at least a portion of the driver's head, readjusts the orientation of the display based on a difference between the determined position of the at least a portion of the driver's head and the predefined coordinates.

2. The vehicular driver assist system of claim 1, wherein the display comprises at least one selected from the group consisting of (i) a cluster display, (ii) a head-up display, (iii) an infotainment display, and (iv) an interior rearview mirror display.

3. The vehicular driver assist system of claim 1, wherein the display comprises a plurality of displays disposed at the vehicle and viewable by the driver of the vehicle, and wherein each display of the plurality of displays comprises one selected from the group consisting of (i) a cluster display, (ii) a head-up display, (iii) an infotainment display, and (iv) an interior rearview mirror display.

4. The vehicular driver assist system of claim 1, wherein the vehicular driver assist system readjusts the orientation of the display based on the determined position of at least the portion of the driver's head to enhance viewability of the display to the driver.

5. The vehicular driver assist system of claim 1, wherein the sensor comprises a camera that captures image data.

6. The vehicular driver assist system of claim 1, comprising a second display, wherein, responsive to determining the position of at least the portion of the driver's head, the vehicular driver assist system shifts display of information from the display to the second display.

7. The vehicular driver assist system of claim 1, wherein the vehicular driver assist system determines the position of at least the portion of the driver's head by determining an eye gaze angle of the driver.

8. The vehicular driver assist system of claim 1, wherein the vehicular driver assist system determines the position of at least the portion of the driver's head and adjusts the orientation of the display responsive to the vehicle being started.

9. The vehicular driver assist system of claim 1, wherein the vehicular driver assist system episodically readjusts the orientation of the display at regular intervals while the driver drives the vehicle.

10. The vehicular driver assist system of claim 1, wherein the vehicular driver assist system determines presence of an occupant of the vehicle other than the driver, and wherein the vehicular driver assist system determines a position of the occupant's head, and wherein the vehicular driver assist system, responsive to determining the position of the occupant's head, adjusts an orientation of a second display based on the determined position of the occupant's head to increase visibility of the second display for the occupant.

11. The vehicular driver assist system of claim 1, comprising a second sensor disposed at the interior of the vehicle, wherein the vehicular driver assist system, responsive to determining the presence of the driver at the driver seat of the vehicle, enables a cabin mode, and wherein the vehicular driver assist system, when the cabin mode is enabled, and responsive to processing by the processor of second sensor data captured by the second sensor, determines that the driver is authorized to operate the vehicle, and wherein responsive to determining that the driver is authorized to operate the vehicle, the vehicular driver assist system generates an operation signal to allow the driver to operate the vehicle.

12. The vehicular driver assist system of claim 11, wherein the second sensor data comprises biometric information of the driver.

13. The vehicular driver assist system of claim 11, wherein the second sensor comprises one selected from the group consisting of (i) a camera, (ii) a fingerprint sensor, and (iii) a microphone.

14. The vehicular driver assist system of claim 1, comprising a second ECU comprising electronic circuitry and associated software, wherein the electronic circuitry of the second ECU comprises an image processor that generates an output for displaying video images derived from the captured sensor data, and wherein the second ECU, responsive to a navigation function of the vehicle, generates a graphical overlay, and wherein the second ECU displays video images representative of the captured sensor data with the graphical overlay at the display.

15. The vehicular driver assist system of claim 14, wherein the graphic overlay is based on a current navigation route of the navigation function.

16. A vehicular driver assist system, the vehicular driver assist system comprising:
- a camera disposed at a vehicle equipped with the vehicular driver assist system and viewing interior of the vehicle, the camera capturing image data;
- a display disposed at the vehicle and viewable by the driver of the vehicle when the driver is driving the vehicle, wherein the display comprises at least one selected from the group consisting of (i) a cluster display, (ii) a head-up display, (iii) an infotainment display, and (iv) an interior rearview mirror display;
- an electronic control unit (ECU) comprising electronic circuitry and associated software;
- wherein the electronic circuitry of the ECU comprises a processor for processing image data captured by the camera;
- wherein the vehicular driver assist system adjusts an orientation of the display based on predefined coordinates, and wherein the predefined coordinates represent a default position based on a common position of a typical driver's head;
- wherein the vehicular driver assist system, via processing at the ECU of image data captured by the camera, determines presence of a driver at a driver seat of the vehicle;
- wherein the vehicular driver assist system, via processing at the ECU of image data captured by the camera, determines a position of at least a portion of the driver's head; and
- wherein the vehicular driver assist system, responsive to determining the position of the at least a portion of the driver's head, readjusts the orientation of the display based on a difference between the determined position of the at least a portion of the driver's head and the predefined coordinates.

17. The vehicular driver assist system of claim 16, wherein the vehicular driver assist system readjusts the orientation of the display based on the determined position of at least the portion of the driver's head to enhance viewability of the display to the driver.

18. The vehicular driver assist system of claim 16, wherein the vehicular driver assist system determines the position of at least the portion of the driver's head by determining an eye gaze angle of the driver.

19. A vehicular driver assist system, the vehicular driver assist system comprising:
- an imaging radar sensor disposed at a vehicle equipped with the vehicular driver assist system and viewing interior of the vehicle, the imaging radar sensor capturing sensor data;
- a display disposed at the vehicle and viewable by the driver of the vehicle when the driver is driving the vehicle;
- an electronic control unit (ECU) comprising electronic circuitry and associated software;
- wherein the electronic circuitry of the ECU comprises a processor for processing sensor data captured by the imaging radar sensor;
- wherein the vehicular driver assist system adjusts an orientation of the display based on predefined coordinates, and wherein the predefined coordinates represent a default position based on a common position of a typical driver's head;
- wherein the vehicular driver assist system, via processing at the ECU of sensor data captured by the imaging radar sensor, determines presence of a driver at a driver seat of the vehicle;
- wherein the vehicular driver assist system, via processing at the ECU of sensor data captured by the imaging radar sensor, determines a position of at least a portion of the driver's head; and
- wherein the vehicular driver assist system, responsive to determining the position of the at least a portion of the driver's head, readjusts the orientation of the display based on a difference between the determined position of the at least a portion of the driver's head and the predefined coordinates.

20. The vehicular driver assist system of claim 19, wherein the vehicular driver assist system determines the position of at least the portion of the driver's head and readjusts the orientation of the display responsive to the vehicle being started.

21. The vehicular driver assist system of claim 19, wherein the vehicular driver assist system episodically readjusts the orientation of the display at regular intervals while the driver drives the vehicle.

* * * * *